Dec. 13, 1960 M. J. CHRISTIANSEN ET AL 2,964,163
ARTICLE DISTRIBUTING APPARATUS
Filed Oct. 6, 1959 3 Sheets-Sheet 1
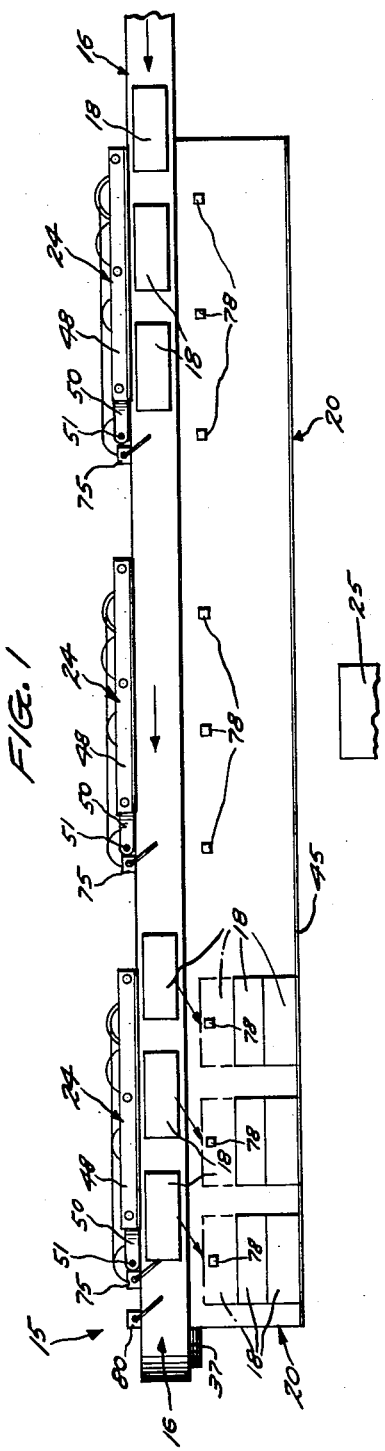
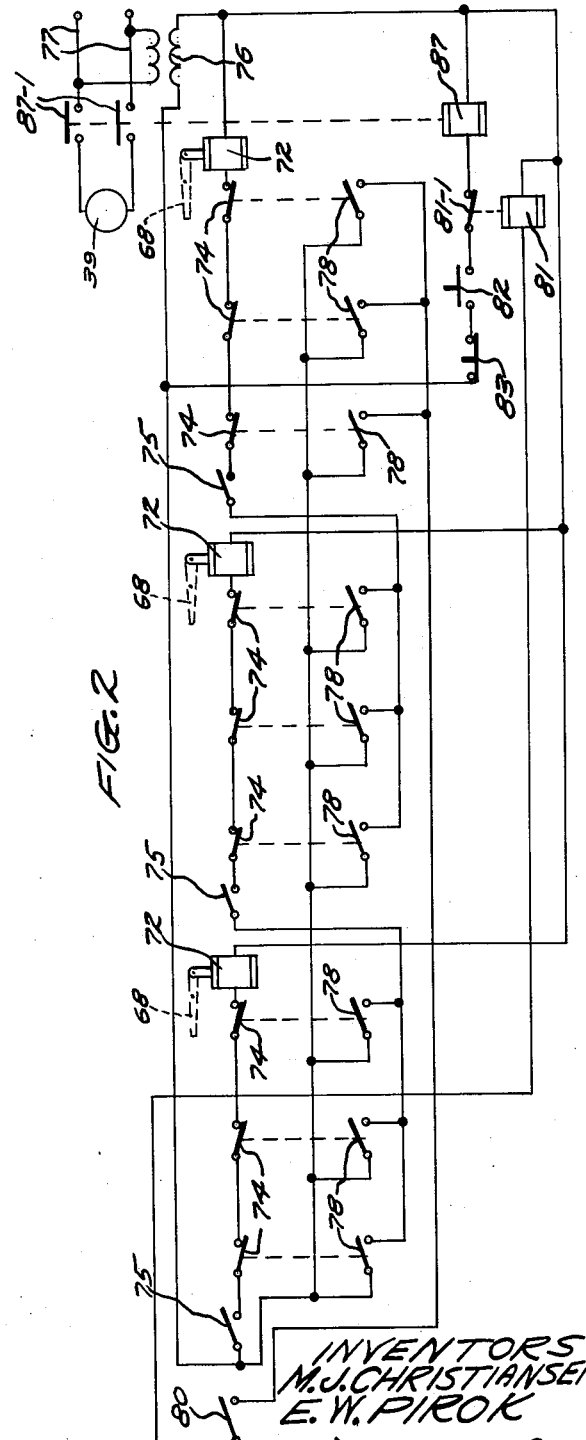
INVENTORS
M.J. CHRISTIANSEN
E.W. PIROK
BY A.C. Schwarz Jr.
ATTORNEY

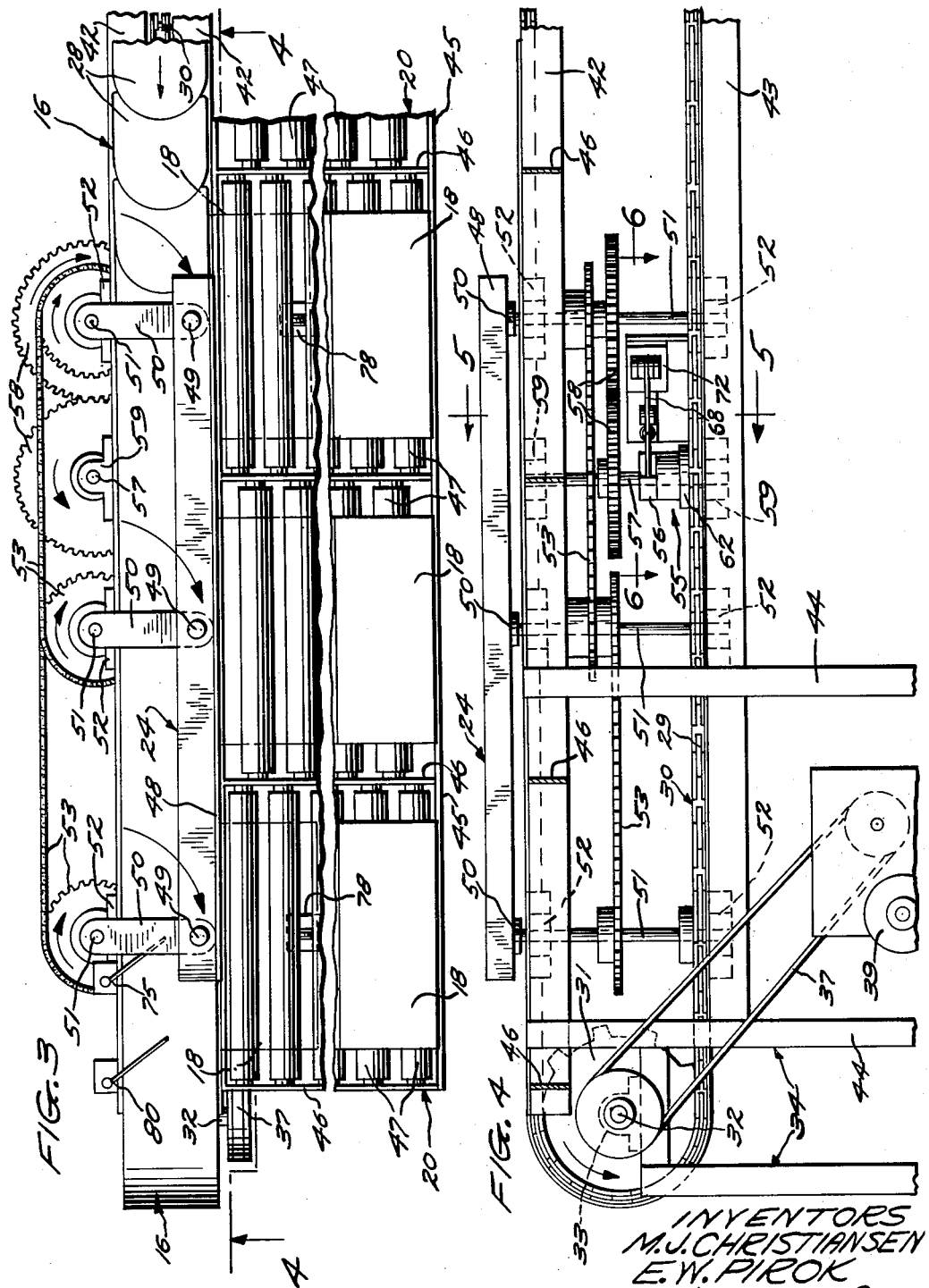

Dec. 13, 1960  M. J. CHRISTIANSEN ET AL  2,964,163
ARTICLE DISTRIBUTING APPARATUS

Filed Oct. 6, 1959  3 Sheets-Sheet 3

INVENTORS
M.J. CHRISTIANSEN
E.W. PIROK
BY A.C. Schwarz, Jr.
ATTORNEY

United States Patent Office 2,964,163
Patented Dec. 13, 1960

2,964,163
ARTICLE DISTRIBUTING APPARATUS

Milton J. Christiansen, Brookfield, and Edward W. Pirok, Westchester, Ill., assignors to Western Electric Company, Incorporated, New York, N.Y., a corporation of New York Filed Oct. 6, 1959, Ser. No. 844,653

8 Claims. (Cl. 198—31)

This invention relates to an article distributing apparatus and more particularly to a mechanism for conveying work pieces to a work station and distributing them progressively onto an accumulating table to provide a readily available supply thereof.

An object of the present invention is to provide an improved article distributing apparatus.

Another object of the invention is to provide an improved mechanism for conveying work pieces to a work station and distributing them progressively onto a table to provide a readily available supply thereof.

A further object of the invention is the provision of an article distributing apparatus having a conveyor for advancing articles to a work station and means for removing the articles from the conveyor and distributing them progressively onto a table, and having means for stopping the conveyor when the table has been filled with articles.

With these and other objects in view, the invention contemplates the provision of a conveyor for advancing a row of spaced articles along a predetermined path into a work station and into alignment with a plurality of pushers arranged on one side of the conveyor and individually operated to push articles laterally from the conveyor onto an elongated table positioned along the other side of the conveyor and sloping laterally downwardly therefrom. The pushers are actuated under control of switches which are mounted in the path of movement of the articles on the conveyor and are individually positioned adjacent one end of a pusher for acutation by the article when the article is aligned with the pusher to effect the operation of the pusher and the transfer of an article from the conveyor to the table.

As successive articles are transferred to the table they are moved by gravity laterally from the conveyor and are supported on the table in transverse rows. Circuit means are provided including a sequencing switch for each transverse row of articles for initially conditioning the endmost pusher for operation, for rendering the pusher inoperative when a predetermined number of articles has been fed into the transverse row, and for conditioning the adjacent pusher for operation. Means including a stop switch mounted in the path of the articles on the conveyor beyond the control switch of the first pusher are provided for stopping the conveyor when the table has been filled with articles.

Other objects and advantages of the invention will become apparent by reference to the following detailed description thereof and the accompanying drawings in which:

Fig. 1 is a diagrammatic plan view of the article distributing apparatus embodying the present invention;

Fig. 2 is a wiring diagram of the control for the apparatus;

Fig. 3 is an enlarged fragmentary plan view of the apparatus;

Fig. 4 is a fragmentary vertical sectional view of the apparatus taken on line 4—4 of Fig. 3;

Figure 6:
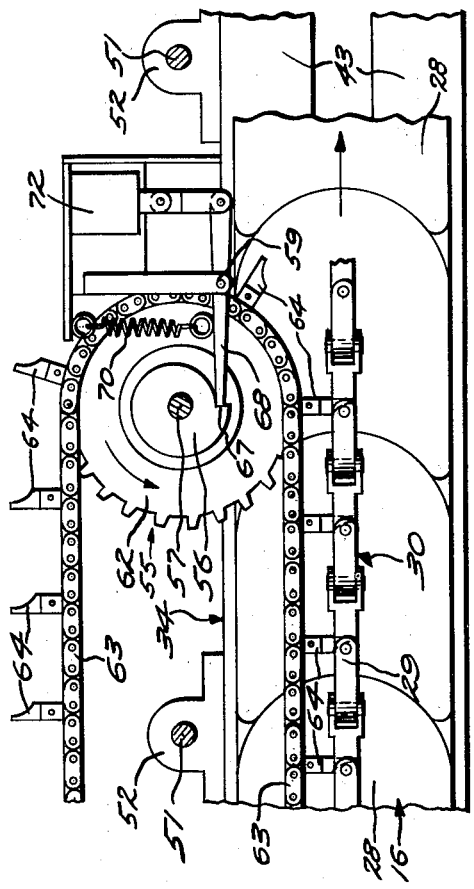
Fig. 6 is an enlarged fragmentary plan sectional view of the apparatus taken on line 6—6 of Fig. 4.

Referring to the drawings, the distributing apparatus 15 comprises a conveyor 16 on which articles 18 are placed in spaced relation to each other by any suitable means (not shown) and are advanced by the conveyor along a predetermined path between an elongated article accumulating and supporting table 20 on one side of the conveyor and in alignment with a plurality of pushers 24 on the opposite side of the conveyor. The articles 18 are arranged in groups of three, the articles of each group being closely spaced and the groups being widely separated from one another. The table 20, which is located at a work station adjacent an article working machine 25, serves as a means for accumulating and supporting an ample supply of readily available articles for the machine 25.

Each of the pushers 24 beginning with the first or left one as shown in Fig. 1 is selectively and individually actuated, to transfer successive groups of three articles 18 aligned therewith laterally from the conveyor 16 onto a limited area of the table 20 aligned with the pushers. The table 20 slopes downwardly laterally from the conveyor so that the articles transferred onto the table will move by gravity from the conveyor toward the lower edge of the table and will be supported in transverse rows 26. After the articles 18 in the transverse rows 26 have reached a predetermined number and the left-hand area of the table, as viewed in Fig. 1, is filled with articles, the first pusher 24 will be rendered inoperative and the second or middle pusher 24 will be conditioned for operation and will serve to transfer articles 18 from the conveyor 16 to the middle area of the table 20, and when that area is filled, the second pusher will be rendered inoperative and the third pusher will be conditioned for operation to transfer the articles from the conveyor to the last or right-hand area of the table.

Figure 5:
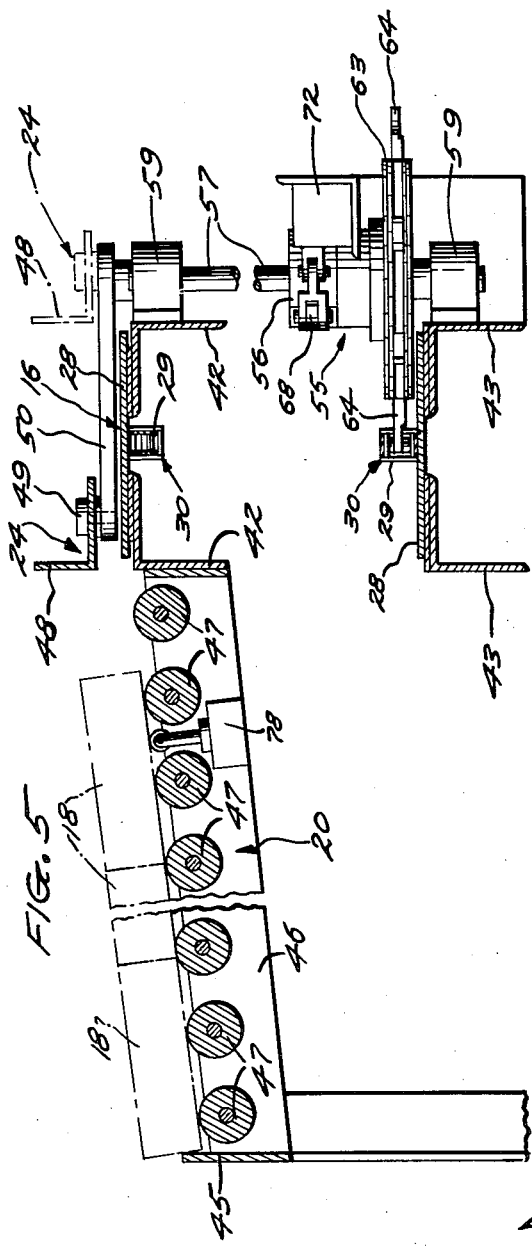
Fig. 5 is an enlarged fragmentary vertical cross-sectional view of the apparatus taken on line 5—5 of Fig. 4.

As seen particularly in Figs. 3, 4 and 5, the conveyor 16, in the form of an endless belt, comprises a plurality of flat metal plates or flight sections 28 connected to links 29 of an endless chain 30. The chain 30 is supported at one end on an idler sprocket (not shown) and at the other end the chain is supported on and driven by a drive sprocket 31. The drive sprocket 31 is carried by a shaft 32 rotatably supported in bearings 33 mounted on a stationary frame 34. The shaft 32 and sprocket 31 are connected through a sprocket and chain connection 37 (Fig. 4) and a gear reducer 38 to a motor 39 for continuously driving the conveyor 16. An upper and a lower pair of longitudinal frame members 42 and 43, respectively, are supported in vertically spaced relation to each other by vertical members 44 and the inwardly directed flanges of the horizontal members 42 and 43 support the metal plates 28 of the conveyor 16.

The article supporting and accumulating table 20 (Figs. 3 and 5) comprises a longitudinal side frame member 45 along an outer edge thereof and a plurality of spaced transverse members 46 extending therefrom to the outer longitudinal member 42. A plurality of rollers 47 are mounted between the transverse frame members 46 to form an inclined supporting surface for receiving the articles as they are ejected from the conveyor 16 and for moving the articles laterally under the force of gravity from the conveyor 16 into engagement with the upwardly projecting portion of the side frame member 45.

Each of the pushers 24 comprises an elongated pusher bar 48 pivotally supported at 49 to the ends of three crank arms 50 which are secured at their other ends to vertically disposed shafts 51 which in turn are rotatably supported in bearings 52 secured to one of the upper and lower longitudinal frame members 42 and 43. The three shafts 51 are connected together for simultaneous rotation by sprocket and chain connections 53 (Fig. 4). Each of the pushers 24 is operatively connected to the conveyor chain 30 and is selectively actuated thereby under control of a one-revolution clutch 55.

Each of the one-revolution clutches 55 has a driven element 56 secured to a shaft 57 which is connected through a pair of gears 58 to one of the shafts 51 and which is rotatably supported in bearings 59 on the horizontal frame members 42 and 43. The driven element of the clutch is connected to a sprocket 62 that is driven by an endless chain 63 which also engages and is supported by a sprocket 64 on another shaft 51. As illustrated in Fig. 6, the chain 63 has lugs 64 extending outwardly therefrom into engagement with the links 29 of the conveyor chain 30 for imparting rotation to the drive shaft 57.

The driven member 56 of the clutch 55 has a shoulder 67 (Fig. 6) thereon which is engageable with the end of a stop lever 68 pivotally supported about a fixed pivot 59 and urged by a spring 70 into engagement with the driven member 56 and the shoulder 67 to disengage the clutch and stop the shaft 57 after one rotation with the pusher member 24 in a position of rest as shown in Fig. 1. A solenoid 72, suitably mounted on the frame 34, is provided for tripping the stop lever 68 to effect the engagement of the one-revolution clutch and one rotation of the drive shaft 57 and one ejecting cycle of the pusher 24 to push the group of three articles 18 aligned therewith from the conveyor 18 onto the supporting table 20.

Referring to Fig. 2, the solenoid 72 for each of the pushers 24 is connected in series with a plurality of three normally closed contacts 74, one for each of the group of articles 18 acted on by the pusher 24, and a pusher operating switch 75, and these groups of electrical elements are adapted to be sequentially connected to a suitable source of current, such as the secondary of a transformer 76, to sequentially condition the pushers 24 for operation. The primary of the transformer 76 is connected to a power line 77.

The pusher operating switches 75 are suitably mounted individually on the frame 34 adjacent one end of each of the pushers 24 and in a position in the path of movement of the articles 18 on the conveyor 16 so as to be actuated by the first of the group of three articles when the group of articles is substantially aligned with the pusher. Thus, when a group of three articles is advanced by the conveyor 16 to a predetermined position in lateral alignment with the first or left-hand pusher 24, the first article of the group engages the first pusher operating switch 75 to complete a circuit through and effect the energization of the first solenoid 72, the actuation of the first one-revolution clutch 55 and the first pusher 24, and the ejection of the group of three articles from the conveyor 16 onto the left-hand area of the table 20.

The contacts 74 are physically connected to sequencing switches 78 which are mounted on the table 20 adjacent the conveyor 16 and in the path of transverse movement of the articles on the table and for actuation by the articles in the transverse rows 26 of articles when a predetermined number of articles have been transferred from the conveyor into the rows on the table. Each of the group of three switches 78 for the first pusher 24 is connected in series with the second pusher switch 75, the second set of three contacts 74 and the second solenoid 72 associated with the second pusher 24, and the group of switches 78 of the second pusher 24 are connected in series with the third pusher switch 75, the third set of three contacts 74 and the third solenoid 72 associated with the third pusher 24.

Thus, when the first pusher switch 75 and the first pusher 24 have been actuated a predetermined number of times and a predetermined number of articles 18 have been transferred onto the table 20 and into the transverse rows 26, the sequencing switches 78 of the first pusher 24 will be closed by the articles 18 to cause the contacts 74 of the first pusher to open, thereby rendering the first pusher 24 inoperative, while at the same time, the closing of the first sequencing switches 78 completes a circuit to the second pusher switch 75 and conditions the second pusher 24 for operation.

When the conveyor 16 advances a group of three articles into alignment with the second pusher 24 and in response to the closing of the second pusher switch 75 a circuit will be completed from the secondary through the first sequencing switches 78, the second pusher switch 75, the second contacts 74, the second solenoid 72 to the transformer, thus energizing the second solenoid 72 to trip the second one-revolution clutch 55 to effect the actuation of the second pusher 24 through one cycle of operation and the transfer of a group of three articles 18 onto the center area of the table 20.

As the second pusher is actuated repeatedly, successive articles are transferred to the table 20 to build up transverse rows 26 of articles 18 and when the predetermined number of articles have been transferred, one of the articles 18 in each of the rows 26 will engage and close the second sequencing switches 78 to render the second pusher 24 inoperative and to condition the third pusher 24 for operation.

The third set of normally open sequencing switches 78 associated with the third pusher 24 are connected in series with a normally open stop switch 80 and a control relay 81 for stopping the conveyor in the event that the third area of the table becomes filled with articles and the table is thereby full of articles. The relay 81 has normally closed contacts 81–1 in series with a start switch 82, a stop switch 83 and a contactor 87 which has contacts 87–1 in series with the conveyor motor 39.

The stop switch 80 is mounted on the frame 34 in the path of movement of the articles on the conveyor 16 in a position slightly beyond the first pusher operating switch 75 and is conditioned for actuation in response to the closing of the sequencing switches 78 of the third pusher 24. This occurs when a predetermined number of the articles have been fed onto the right-hand area of the table 20 and the table 20 is filled with articles and the third and last pusher 24 is rendered inoperative. The conveyor 16 then advances the row of articles past the third, the second and the first pushers 24 and trips the stop switch 80 which completes a circuit to energize the relay 81 and open its contacts 81–1 thereby deenergizing the contactor 87 to effect the stopping of the conveyor drive motor 39 and the conveyor 16.

If the table 20 becomes filled with articles and causes the conveyor 16 to stop, operation of the apparatus may be resumed after a substantial number of the articles 18 have been removed from the first or left-hand area of the table 20. The operator may then remove the first group of articles 18 from the stopped conveyor 16 to restore the stop switch 82 to its normally open position and he may then close the start switch 82.

It will be noted that one pusher 24 is rendered inoperative and the adjacent pusher is conditioned for operation when a predetermined number of articles 18 have been fed or transferred into a transverse row 26 of articles on the table 20. Thus, in the event that one or two of the articles are missing fom some of the groups of articles on the conveyor 16 it is of no consequence and does not interfere with the operation of the machine. It will be apparent that the present machine is capable of distributing individual articles as well as groups of articles.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A distributing apparatus comprising a conveyor for advancing a row of spaced articles along a longitudinal path, a plurality of pusher means arranged longitudinally of said conveyor for ejecting the articles laterally therefrom, means positioned along one side of said conveyor for receiving the ejected articles and supporting them in transverse rows, control means for each of said pusher means operable in response to the movement of an article on the conveyor to a position in alignment with the pusher means to effect the actuation of said pusher means, and sequencing means including a control element for each transverse row of articles for rendering an operative pusher means inoperative when a predetermined number of articles have been fed into a transverse row and for conditioning another pusher means for operation.

2. A distributing apparatus comprising a conveyor for advancing a row of spaced articles along a longitudinal path, a row of pusher means arranged longitudinally of and on one side of said conveyor for ejecting the articles laterally therefrom, a table positioned along the other side of said conveyor and sloping downwardly from said conveyor for receiving the ejected articles and supporting them in transverse rows, control means including a switch for each of said pusher means operable in response to the movement of an article on the conveyor to a position in alignment with the pusher means to effect the actuation of said pusher means, and sequencing means for initially conditioning an end one of said pusher means and successive pusher means thereafter for operation, said sequencing means including a switch for each transverse row of articles for rendering the operative pusher means inoperative when a predetermined number of articles has been transferred by said operative pusher means into a transverse row and for conditioning the adjacent pusher means for operation.

3. A distributing apparatus comprising a conveyor for advancing a row of spaced articles along a longitudinal path, a plurality of pusher means arranged along said conveyor for ejecting the articles laterally therefrom, means positioned along one side of said conveyor for receiving the ejected articles and supporting them in transverse rows, means including a switch for each of said pusher means disposed in the longitudinal path of movement of the articles in a position to be actuated by an article when the article is aligned with the pusher means to render said pusher means operative, circuit means for initially conditioning a predetermined pusher means for operation, said circuit means including a sequencing switch for each transverse row of articles for rendering a pusher means inoperative when a predetermined number of articles has been fed into the transverse row and for conditioning another pusher means for operation, and means responsive to all of the pusher means being rendered inoperative for stopping the conveyor.

4. In an article distributing apparatus a conveyor for advancing a row of spaced articles along a predetermined path to a work station, an article supporting and accumulating table positioned on one side of said conveyor at said work station, a plurality of pusher means mounted on the other side of said conveyor at said work station for ejecting the articles from the conveyor onto successive areas longitudinally of the table, said table sloping downwardly laterally from the conveyor for moving the articles from the conveyor under the force of gravity and for supporting the articles in transverse rows, means on the table for limiting the lateral movement of the articles, control means for each of said pusher means operable in response to the movement of an article on the conveyor to a position in alignment with the pusher means to effect the actuation of said pusher means, and sequencing means for initially conditioning an end one of said pushers for operation, said sequencing means including a control element for each transverse row of articles actuatable by an article when the articles in the row have reached a predetermined number for rendering the operative pusher means inoperative and for conditioning the adjacent pusher means for operation.

5. An apparatus for maintaining a supply of work pieces at a work station comprising a conveyor for advancing a row of articles along a predetermined path to the work station wherein the row of work pieces are arranged in groups with a predetermined number of work pieces in each group and with the work pieces of each group slightly separated from one another and with the groups of work pieces widely separated from one another, a table mounted adjacent to and on one side of said conveyor at said work station and sloping downwardly laterally from the conveyor, a row of pushers mounted on the other side of said conveyor for individually pushing groups of the work pieces from the conveyor onto successive areas of the table, roller means on the table for moving the work pieces laterally from the conveyor under the force of gravity and for supporting the work pieces in transverse rows, means on the table for limiting the lateral movement of the work pieces, control means for each of the pushers including a switch mounted in the path of movement of the work pieces on the conveyor and actuatable by a work piece in response to the movement of a group of work pieces to a position in alignment with the pusher to effect the operation of said pusher, sequencing means for initially conditioning an end pusher and successive pushers thereafter for operation, said sequencing means including a sequencing switch mounted on the table in alignment with the transverse rows of work pieces and actuatable by a work piece when the work pieces in the transverse row have reached a predetermined number for rendering said operative pusher inoperative and for conditioning the adjacent pusher for operation.

6. In an article distributing apparatus a conveyor for advancing a row of spaced articles along a predetermined path, an article supporting table positioned adjacent to one side of said conveyor, a row of pushers mounted on the other side of said conveyor for ejecting the articles from the conveyor onto successive longitudinal portions of the table, said table sloping downwardly laterally from the conveyor for moving the articles from the conveyor under the force of gravity and for supporting the articles in transverse rows, means on the table for limiting the lateral movement of the articles, each of said pushers comprising a pusher bar disposed parallel to said conveyor, a plurality of crank arms pivotally connected at one end to the pusher bars and supported at the other end for rotation about parallel axis, drive means including a one-revolution clutch for rotating said crank arms through one revolution, control means for each of said pushers including a switch mounted in the path of movement of the articles on the conveyor and actuatable in response to the movement of an article to a position in alignment with the pusher to effect the operation of said pusher, sequencing means for initially conditioning an end pusher and successive pushers thereafter for operation, said sequencing means including a sequencing switch on said table for each transverse row of articles actuatable by an article when the articles in the transverse row have reached a predetermined number for rendering said operative pusher inoperative and for conditioning the adjacent pusher for operation.

7. In an article distributing apparatus a conveyor for advancing a row of spaced articles along a predetermined path, an article supporting table positioned adjacent to one side of said conveyor, a plurality of pusher means mounted on the other side of said conveyor for ejecting the articles from the conveyor onto successive longitudinal portions of the table, said table sloping downwardly laterally from the conveyor, roller means on said table for moving the articles laterally from the conveyor under the force of gravity and for supporting the articles in transverse rows, means on the table for limiting lateral movement of the articles, each of said pushers comprising a pusher bar disposed parallel to said conveyor, a plurality of crank arms pivotally connected at one end to the pusher bars and supported at the other end for rotation about parallel axis, drive means including a one-revolution clutch for rotating said crank arms through one revolution, control means for each of said pushers including a trip switch mounted in the path of movement of the articles on the conveyor and actuatable in response to the movement of an article to a position of alignment with the pusher to effect the actuation of said pusher, sequencing means for initially conditioning an end pusher and successive pushers thereafter for operation, said sequencing means including a sequencing switch for each transverse row of articles actuatable by an article when the articles in the row have reached a predetermined number for rendering an operative pusher inoperative and for conditioning the adjacent pusher for operation, drive means for actuating said conveyor, a stop switch mounted in the path of the articles on said conveyor adjacent to and beyond the trip switch for said end pusher, and means conditioned for operation in response to actuation of the sequencing switch associated with the other end pusher and operable in response to the actuation of said stop switch by an article on said conveyor for rendering said conveyor drive means inoperative.

8. In a distributing apparatus a conveyor including an endless chain for supporting a row of spaced articles thereon, a drive means for actuating said conveyor to advance the articles along a predetermined path, a table positioned adjacent to and on one side of said conveyor, a plurality of pushers mounted on the other side of said conveyor for ejecting the articles from the conveyor onto successive portions of the table, said table sloping downwardly laterally from the conveyor for moving the articles from the conveyor under the force of gravity and for supporting the articles in transverse rows, means on said table for limiting the lateral movement of the articles, each of said pushers comprising a pusher bar disposed parallel to said conveyor, a plurality of parallel crank arms pivotally connected at one end to the pusher bars and supported at the other end for rotation about vertical axes, means for interconnecting said crank arms for simultaneous rotation in the same direction, a pair of sprockets mounted for rotation about vertical axes, an endless auxiliary chain for driving said sprockets and having outwardly directed lugs movable into and out of engagement with said conveyor chain and advanced thereby for actuating said auxiliary chain, means including a one-revolution clutch for effecting a driving connection between one of said sprockets and one of said crank arms, control means for said one-revolution clutch including a switch mounted in the path of movement of the articles on the conveyor and actuatable by an article in response to the movement thereof to a position in alignment with the pusher to effect the actuation of said pusher; sequencing means for initially conditioning for operation an end pusher and successive of said row of pushers thereafter, said sequencing means including a plurality of switches mounted on the table in alignment with the position of transverse rows of articles supported thereon and actuatable by an article when the articles in the row have reached a predetermined number for rendering the operative pusher inoperative and for conditioning the adjacent pusher for operation.

References Cited in the file of this patent

UNITED STATES PATENTS 2,789,678     Hickin _____ Apr. 23, 1957